United States Patent
Olgaard et al.

(10) Patent No.: US 9,544,787 B2
(45) Date of Patent: *Jan. 10, 2017

(54) METHOD FOR TESTING DATA PACKET SIGNAL TRANSCEIVERS USING INTERLEAVED DEVICE SETUP AND TESTING

(71) Applicant: LITEPOINT CORPORATION, Sunnyvale, CA (US)

(72) Inventors: Christian Volf Olgaard, Saratoga, CA (US); He Zhao, Nanjing (CN)

(73) Assignee: LitePoint Corporation, Sunnyvale, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/017,041

(22) Filed: Sep. 3, 2013

(65) Prior Publication Data

US 2015/0063133 A1 Mar. 5, 2015

(51) Int. Cl.
*H04W 24/08* (2009.01)
*H04B 17/00* (2015.01)
*H04B 17/21* (2015.01)

(52) U.S. Cl.
CPC ......... *H04W 24/08* (2013.01); *H04B 17/0085* (2013.01); *H04B 17/21* (2015.01)

(58) Field of Classification Search
None
See application file for complete search history.

(56) References Cited

U.S. PATENT DOCUMENTS

| | | | |
|---|---|---|---|
| 7,240,258 B1 | 7/2007 | Hayes | |
| 7,876,697 B2 * | 1/2011 | Thompson | H04B 10/0775 370/252 |
| 8,036,652 B2 * | 10/2011 | Kawamoto | H04W 24/06 370/242 |
| 8,085,685 B2 * | 12/2011 | Olgaard | H04L 12/56 370/242 |
| 8,412,180 B2 * | 4/2013 | Huber | H04B 17/0085 455/423 |
| 8,811,194 B2 * | 8/2014 | Olgaard | H04L 43/50 370/249 |
| 2004/0193990 A1 | 9/2004 | Ichiyoshi | |
| 2006/0012388 A1 | 1/2006 | Lin et al. | |
| 2006/0215744 A1 | 9/2006 | O'Neill | |
| 2007/0198881 A1 * | 8/2007 | Volkerink et al. | 714/724 |
| 2007/0243825 A1 | 10/2007 | Olgaard et al. | |
| 2008/0172588 A1 | 7/2008 | Olgaard | |
| 2010/0261431 A1 | 10/2010 | Olgaard | |
| 2011/0069624 A1 | 3/2011 | Olgaard | |
| 2012/0121001 A1 | 5/2012 | Olgaard et al. | |

(Continued)

OTHER PUBLICATIONS

International Search Report and Written Opinion in PCT/US2014/050285 issued Nov. 19, 2014, 14 pages.

(Continued)

*Primary Examiner* — Gregory Sefcheck
(74) *Attorney, Agent, or Firm* — Banner & Witcoff, Ltd.

(57) ABSTRACT

A method of using tester data packet signals and control instructions for testing multiple data packet signal transceiver devices under test (DUTs). During mutually alternating time intervals, selected ones of which are substantially contemporaneous, multiple tester data packet signals and DUT control instructions are used for concurrent testing of multiple DUTs.

12 Claims, 5 Drawing Sheets

(56) References Cited

U.S. PATENT DOCUMENTS

2012/0123723 A1* 5/2012 El-Hassan et al. ........... 702/108

OTHER PUBLICATIONS

International Search Report and Written Opinion in PCT/US2014/050297 issued on Nov. 11, 2014, 10 pages.
U.S. Appl. No. 14/017,077, filed Sep. 3, 2013, "Method for Testing Data Packet Signal Transceivers With Multiple Radio Access Technologies Using Interleaved Device Setup and Testing".
International Preliminary Report on Patentability and Written Opinion of the International Searching Authority filed in PCT/US2014/050285; dated Nov. 19, 2014.

* cited by examiner

METHOD FOR TESTING DATA PACKET SIGNAL TRANSCEIVERS USING INTERLEAVED DEVICE SETUP AND TESTING

BACKGROUND

The present invention relates to testing data packet signal transceivers, and in particular, to achieving faster test times by using interleaved device setup and testing.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems (also referred to as "testers") employ a subsystem for analyzing signals received from each device. Such subsystems typically include at least a vector signal generator (VSG) for providing the source signals to be transmitted to the device under test, and a vector signal analyzer (VSA) for analyzing signals produced by the device under test. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

As will be readily appreciated, testing of a data packet signal transceiver, also referred to as a device under test (DUT), requires a finite amount of time. Depending upon the wireless technology or standard (and sometimes multiples of which) for which the DUT is to be tested, it will take more or less test time for the DUT to be fully tested to confirm its proper functioning and operation. Times required for these tests have been reduced at times by applying various testing techniques, though further changes in techniques have tended to be insignificant, thereby bringing diminishing returns. As a result, testing techniques have been focused on testing multiple DUTs concurrently so that even though the actual test time per device may not be reduced appreciably, the number of DUTs tested in that time interval increases, thereby having the net effect of reducing overall per-DUT test time, and thereby reducing testing costs for each DUT.

However, when multiple DUTs are to be tested concurrently, using a test system, also referred to as a tester, having a single test signal source (e.g., a single VSG) and a single test signal analyzer (e.g., a single VSA), it is generally not possible to perform a transmit signal test simultaneously for all DUTs. This is due to the fact that the test signal analyzer can only receive, capture and analyze a transmit signal from one DUT at a time. For receive signal testing, where the single test signal source provides a single test signal, it is possible to replicate the test signal using power dividers, and thereby provide simultaneous test signals to multiple DUTs. However, in cases where each DUT has multiple receivers (e.g., multiple-input, multiple-output, also referred to as MIMO), each DUT will still require testing individually, since sourcing the same signal to all DUT receive ports will not allow detection of a bad individual receiver among the DUT receiver circuitry. Thus, each DUT must be controlled between each test sequence. Alternatively, multiple test signal sources can be used to generate multi-stream test signals, but such test signal sources tends to be prohibitively expensive for replicating on the scale needed for manufacturing tests of many DUTs.

In particular, two tasks necessary to perform during DUT testing are those of controlling (e.g., preparing or setting up) the DUT for its upcoming test, and allowing time for the DUT transmitter circuitry to settle to its steady state operation and thereby provide consistent transmit signal power. Both of these tasks must generally be performed at the beginning of a transmit signal test, and can be longer (often significantly) than the duration of the test data packet exchanges between the tester and DUT.

Accordingly, it would be desirable to have a technique for testing data packet signal transceivers in which that time otherwise lost while awaiting initial setup of the DUT for the upcoming test sequence and power settling of its transmitted data packet signal can instead be used for performing useful tasks that are part of, or otherwise associated with, the test to be performed. Additionally, if such testing method could be applied to multiple DUTs for simultaneous testing, further time savings could be achieved.

SUMMARY

In accordance with the presently claimed invention, a method is provided for using tester data packet signals and control instructions for testing multiple data packet signal transceiver devices under test (DUTs). During mutually alternating time intervals, selected ones of which are substantially contemporaneous, multiple tester data packet signals and DUT control instructions are used for concurrent testing of multiple DUTs.

In accordance with one embodiment of the presently claimed invention, a method of using tester data packet signals and control instructions for testing multiple data packet signal transceiver devices under test (DUTs) includes: receiving, with each one of first one or more of a plurality of DUTs during one of a first plurality of tester signal intervals, a respective one of a plurality of tester data packet signals; receiving, with each one of second one or more of the plurality of DUTs during one of a second plurality of tester signal intervals, a respective one of the plurality of tester data packet signals; executing, with each one of the first one or more of the plurality of DUTs during one of a first plurality of instruction intervals, a plurality of DUT control instructions to configure each one of the first one or more of the plurality of DUTs to receive a respective one of the plurality of tester data packet signals; and executing, with each one of the second one or more of the plurality of DUTs during one of a second plurality of instruction intervals, a plurality of DUT control instructions to configure each one of the second one or more of the plurality of DUTs to receive a respective one of the plurality of tester data packet signals. Respective ones of the first plurality of tester signal intervals and the first plurality of instruction intervals are mutually alternating, respective ones of the second plurality of tester signal intervals and the second plurality of instruction intervals are mutually alternating, respective ones of the first plurality of tester signal intervals are substantially contemporaneous with respective ones of the second plurality of instruction intervals, and respective ones of the second plurality of tester signal intervals are substantially contemporaneous with respective ones of the first plurality of instruction intervals.

In accordance with another embodiment of the presently claimed invention, a method of providing tester data packet signals and control instructions for testing multiple data packet signal transceiver devices under test (DUTs) includes: providing, for each one of first one or more of a plurality of DUTs during one of a first plurality of tester signal intervals, a respective one of a plurality of tester data packet signals; providing, for each one of second one or more of the plurality of DUTs during one of a second plurality of tester signal intervals, a respective one of the plurality of tester data packet signals; providing, for execution by each one of the first one or more of the plurality of DUTs during one of a first plurality of instruction intervals, a plurality of DUT control instructions to configure each one of the first one or more of the plurality of DUTs to receive a respective one of the plurality of tester data packet signals; and providing, for execution by each one of the second one or more of the plurality of DUTs during one of a second plurality of instruction intervals, a plurality of DUT control instructions to configure each one of the second one or more of the plurality of DUTs to receive a respective one of the plurality of tester data packet signals. Respective ones of the first plurality of tester signal intervals and the first plurality of instruction intervals are mutually alternating, respective ones of the second plurality of tester signal intervals and the second plurality of instruction intervals are mutually alternating, respective ones of the first plurality of tester signal intervals are substantially contemporaneous with respective ones of the second plurality of instruction intervals, and respective ones of the second plurality of tester signal intervals are substantially contemporaneous with respective ones of the first plurality of instruction intervals.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, and the like, all make use of standards-based wireless signal technologies, such as: IEEE 802.11a, b, g, n, ac; 3GPP LTE; and Bluetooth. The standards that underlie these technologies are designed to provide reliable wireless connectivity or communications, and prescribe physical and higher-level specifications that are generally chosen to be highly energy efficient and to minimize interference among devices using the same or other technologies that are adjacent to or share the wireless spectrum.

Tests prescribed by these standards are meant to ensure that such devices are designed to conform to standard-prescribed specifications and that manufactured devices continue to conform to those prescribed specifications. Most devices are transceivers, containing at least one or more (each) receivers and transmitters. Thus, tests will determine whether both receivers and transmitters of a device under test (DUT) conform. Tests of a DUT's receiver or receivers are RX tests, and typically involve sending of test packets by a test system, or tester, to the receiver(s) and some means of determining how the DUT's receiver(s) respond to those test packets. A DUT's transmitters are tested by having them send packets to the test system, which then evaluates the physical characteristics of the signals sent by the devices.

The RX test packets are generated by the test system (e.g., a VSG) and the TX test packets are generated by the DUT and evaluated by a test system's analysis subsystem (e.g., a VSA).

In the case of RX tests, some standards, such as IEEE 802.11a, b, g, n and ac, require that a device that receives a good packet confirm its receipt by sending a confirmation (e.g., ACK) packet back to the sending device, which in a test environment is the test system. Thus, a test system sending test packets that fall within prescribed frequency, power and modulation characteristics, and whose data are consistent with an appended checksum, would expect to receive a confirmation packet each time one is sent. A standard will prescribe some worst-case number of missed packets that still falls within acceptable limits. So, if a tester sent X test packets, and received Y confirmation packets, once some minimum number of packets were exchanged, the packet error rate (PER), for example, could be computed. In general, the data rate at which confirmation packets are sent is chosen to optimize the likelihood of being received. The power level of a confirmation packet can also be selected.

During a TX test, a device sends test packets to a test system, which, in turn, analyzes the received test packets for a variety of physical characteristics, such as frequency, power, modulation, and a quality metric, such as error vector magnitude (EVM). When a device's transmitter is turned on or after changing frequency or transmit power level, and begins sending, there is a time interval during which the transmitter power output will vary over a range of values, thus making it unacceptable to use for analysis, as the packets do not represent normal signal behavior. Therefore, most test programs allow for a period of initial test packet sending that ignores those packets until a transmitter is likely to have settled. That settling wait time can be longer than the actual test time, thereby extending test time and decreasing test efficiency.

As discussed in more detail below, time asymmetry between intervals of time needed for controlling a DUT for its upcoming test and for a DUT transmitter to settle to its steady state operation, and time needed for performing the test, is advantageously used to shorten overall test time and thereby reduce test cost. This can be achieved by interleaving the time intervals needed for DUT control and testing.

For example, during a receive signal test, where multiple DUTs are being controlled and the tester is sending test data packets with prescribed power levels, data rates and signal modulation types, DUT control events (e.g., for setting up the DUT for an upcoming test) can be interleaved while avoiding overlaps of test data packet exchanges between the tester and the multiple DUTs. Further, in those cases where the time needed for DUT control, or set up, is equal to or longer than the time interval needed for the actual test that follows, interleaving of the DUT control intervals can significantly shorten the overall required testing time (i.e., the time needed for controlling the DUT and performing the actual test sequence). For example, in a receive signal packet error rate (PER) test, where the duration of the DUT control interval is often significantly longer than the actual DUT PER test time, the overall time for testing DUTs is only one DUT PER test increment longer than the time for testing a single DUT. This beneficial time reduction improves further where the ratio between DUT control time and DUT PER test time increases.

Figure 1:
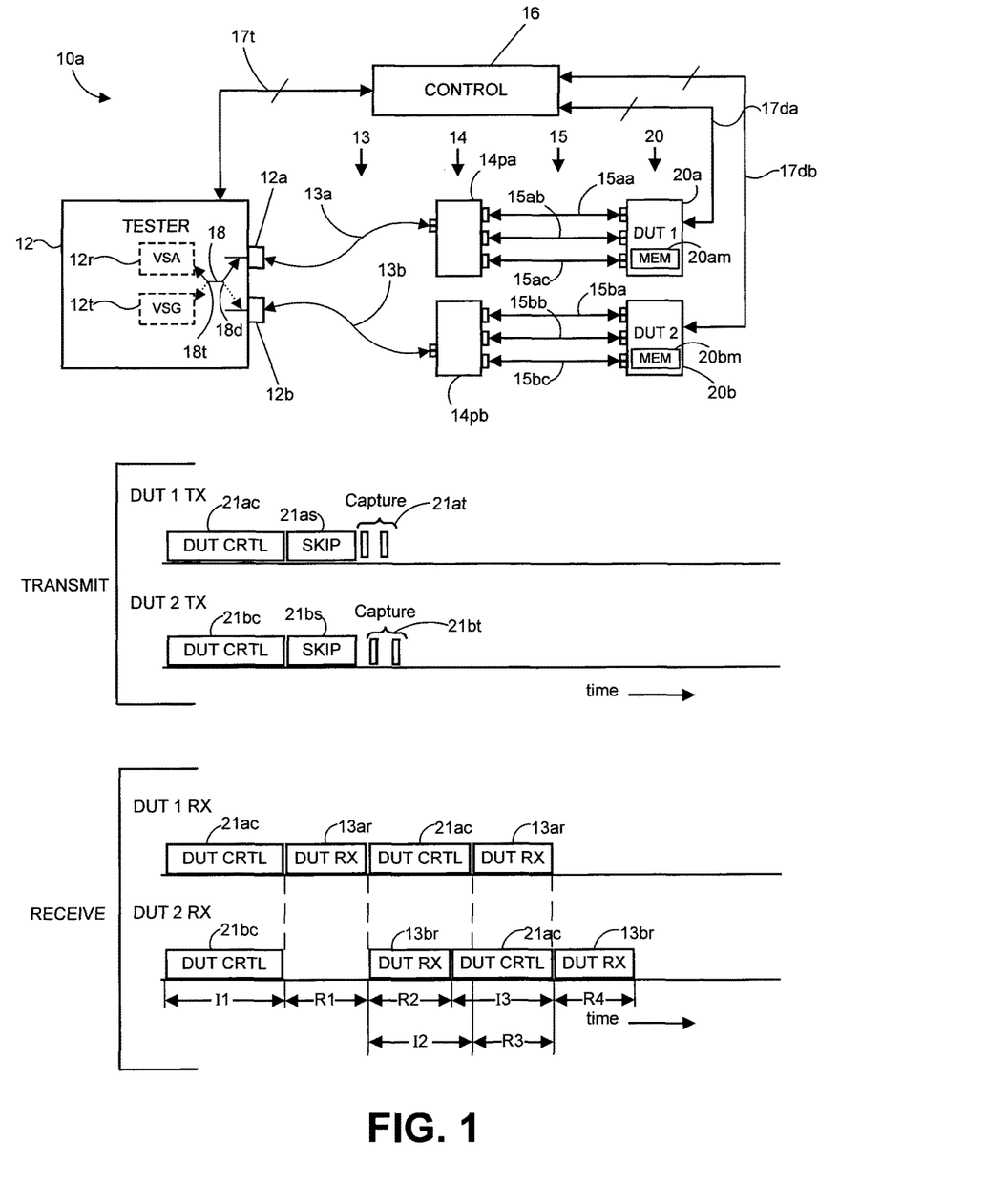
FIG. 1 depicts a testing environment and signal diagram for an exemplary embodiment in which DUT transmit and receive signal testing is interleaved with DUT controls for upcoming DUT tests.

Referring to FIG. 1, a testing environment 10a for testing multiple DUTs using interleaved DUTs control and testing in accordance with exemplary embodiments includes a tester 12, signal routing circuitry 14 and a control system or circuitry 16 (which may be external to, as well as remote from, the tester 12, or may be internal to, e.g., part of, the tester 12) for testing multiple DUTs 20. In accordance with well-known principals, the tester 12 includes a test signal source 12t (e.g., a VSG) and a test signal analyzer 12r (e.g., a VSA), along with a signal switching subsystem 18 that includes switching circuitry 18d for selecting between the input/output (I/O) ports 12a, 12b, and switching circuitry 18t for selecting among signal paths to and from the signal source 12t and signal analyzer 12r.

Test signals from and to the tester 12 are conveyed via signal paths 13a, 13b (typically conductive signal paths in the form of coaxial radio frequency (RF) cables and connectors) to and from the signal routing circuitry 14. In this embodiment, the signal routing circuitry 14 includes power dividers 14pa, 14pb which act as signal replicators in the receive direction (tester-to-DUT) and as signal combiners in the transmit direction (DUT-to-tester).

The signal routing circuitry 14 communicates with the DUTs 20a, 20b via additional signal paths 15 (also typically conductive signal paths in the form of coaxial RF cables and connectors). The control system 16 provides control signals (e.g., instructions and data) and receives data from the tester 12 and DUTs 20a, 20b via control signal interfaces 17t, 17da, 17db, which may be separate or shared (e.g., via a network). The DUTs 20a, 20b can include respective memory circuitry 20am, 20bm for storing instructions and data, as desired, for later execution and use. (In this exemplary embodiment, the DUTs 20 are MIMO devices capable of transmitting and receiving via all input/output ports.)

In this testing environment 10a, the tester 12 can test both DUTs 20a, 20b, though not in parallel, using port switching via the internal 18t and port 18d switching circuitry to switch from receiving data packet signals to sending data packet signals. For example, this configuration can be used to test MIMO DUTs 20 using composite error vector magnitude (EVM) test methods. (Examples of such methods can be found in U.S. Pat. Nos. 7,706,250 and 7,822,130, the contents of which are incorporated herein by reference.) Such a testing environment 10a can also be used to test one DUT port at a time by instructing the DUT to transmit via one I/O signal port, and then via another I/O port, and so on. During such transmit signal testing, as shown in the transmit signal diagram, the DUTs 20a, 20b are executing respective DUT control instructions 21ac, 21bc for configuring the respective DUT transmitter circuits for transmitting data packet signals. (These executed DUT control instructions 21ac, 21bc can be instructions that had been previously stored in the memory circuits 20am, 20bm, or can be instructions executed as received in real time from the control system 16). Typically, during execution of these DUT control instructions 21ac, 21bc, there is little or no data packet signal interaction between the DUTs 20a, 20b and tester 12.

Following initiation of a transmit signal test, the DUTs 20 begin sending data packet signals, in accordance with their respective control instructions 21ac, 21bc, at prescribed power levels, data rates and signal modulation types. As is well known, until the transmitter circuitry settles to steady state operation (e.g., operating with a substantially constant set of physical circuit characteristics, such as voltage levels, current magnitudes and operating temperature), the tester 12 (e.g., in accordance with instructions from the control systems 16) will ignore, or skip, those initial data packets during these time intervals 21as, 21bs of signal instabilities (e.g., variations in power level greater than allowed by the prescribed standard).

After transmitting the prescribed number of data packets during these time intervals 21as, 21bs, the tester 12 begins capturing and analyzing the test data packets transmitted by the DUTs 20a, 20b in an alternating manner, such that data packets from the first DUT 20a are captured and analyzed for a prescribed time interval, following which data packets from the second DUT 20b are then captured and analyzed (in accordance with appropriate control of the tester switching circuitry 18). This process is repeated, switching back and forth between the two DUTs 20a, 20b, using the DUT control intervals 21ac, 21bc to change data packet signal characteristics, such as power level, data rate and signal modulation type, as well as to select among the DUT I/O signal ports.

During a receive signal test, i.e., where the tester 12 is sending test data packet signals to the DUTs 20, the DUT control sequences can be used to select or enable multiple DUT receivers at one time and to put the DUTs in receive mode. This is often done for simple testing of MIMO-capable receivers where the DUT receivers are sequentially tested individually, rather than all being tested in parallel. This reduces equipment costs, since testing all receivers in parallel will require individual input signals, e.g., requiring multiple test signal sources 12*t*. As depicted in the transmit signal diagram, this testing environment 10*a* advantageously allows all DUT transmitters to be tested in a single test sequence where, using the tester switching circuitry 18, alternating DUT transmit signal sequences 21*at*, 21*bt* can be captured for analysis.

Meanwhile, receive signal testing requires DUT interactions. With only one test signal source 12*t*, the tester 12 cannot provide separate (e.g., different) test signals to both DUTs 20*a*, 20*b* simultaneously. Further, since DUT interaction is required between the testing of each receiver circuit (e.g., to disable and enable respective receiver circuits), there will be time intervals during which the receive circuitry operation of the DUTs 20*a*, 20*b* must be updated, or reconfigured. Such time intervals can be used for interleaving DUT configuration operations and testing by having the DUT currently not receiving a test signal from the tester 12 instead executing its DUT control instructions (e.g., to initially configure or later reconfigure its receiver circuitry).

For example, as shown in the receive signal diagram, during interval I1, both DUTs 20*a*, 20*b* are executing their respective control instructions 21*ac*, 21*bc* (e.g., using instructions previously stored in memory 20*am*, 20*bm* or executing instructions as received in real time from the control system 16). Subsequently, during interval R1, the first DUT 20*a* performs its receive signal test 13*ar*. This, in turn, as followed by overlapping time intervals R2, I2, I3, R3, during which the first DUT 20*a* executes its control instructions 2*l* ac while the second DUT 20*b* performs its receive signal test 13*br* and begins executing its control instructions 21*ac*, followed, further in turn, by the second DUT 20*b* continuing its execution of control instructions 21*ac* and the first DUT 20*a* performing its receive signal operation 13*ar*. This sequence of operations can be repeated, as desired, e.g., with the second DUT 20*b* performing its next receive signal test 13*br* as shown.

Accordingly, two test-related operations can be performed concurrently, i.e., a DUT receive signal test involving conveyance of test data packets from the tester 12 to one DUT, while a DUT control sequence is executed in or by the second DUT. Since the DUT control sequence involves no conveyance of tester data packet signals, it can occur concurrently with an ongoing DUT receive signal test in the other DUT. Such concurrence of test-related activities shortens the overall test time, and, therefore, the effective test time and test cost for each DUT. As part of such concurrent activities, the DUT can also send response signals, such as acknowledgement (ACK) signals, back to the tester 12, and, if DUT statistics between tests are desired, this can be done as part of the DUT control sequences.

Figure 2:
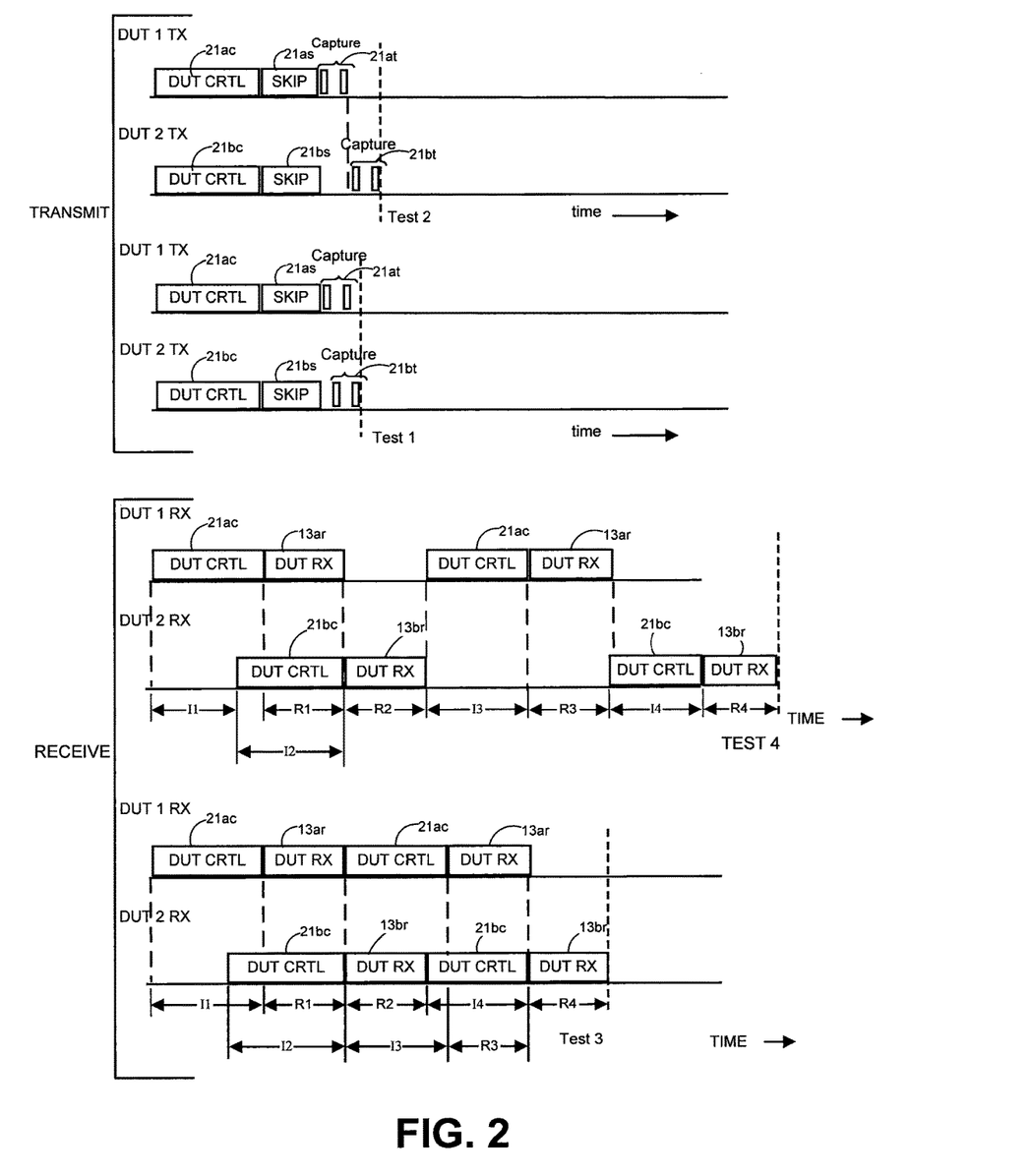
FIGS. 2 and 3 depict signal diagrams for further exemplary embodiments in which DUT transmit and receive signal testing is interleaved with DUT controls for upcoming DUT tests.

Referring FIG. 2, as shown in the transmit signal diagram, during transmit signal testing, the elapsed test time test2 when no interleaving is used is longer than the elapsed test time test1 when interleaving is used. Similarly, during receive signal testing, the elapsed test time test4 when no interleaving is used is longer than the elapsed test time test3 when interleaving is used. As can be seen, such interleaving provides benefits during both transmit and receive testing, though the benefits are generally greater for receive testing.

Figure 3:
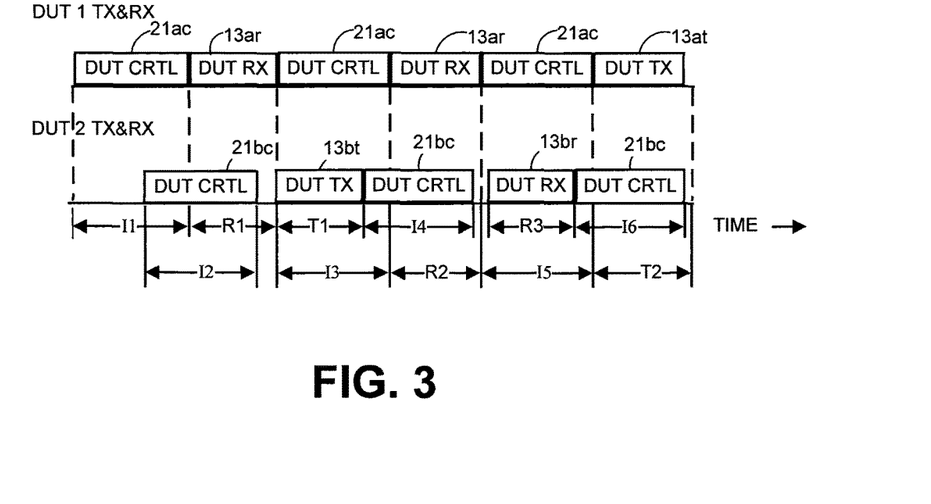

Referring to FIG. 3, similar test time reduction can be achieved by interleaving both transmit and receive signal testing between the DUTs 20. For example, one DUT can be configured to and perform a receive signal test during intervals I1, R1 that are, at least substantially, concurrent with another interval I2 during which the other DUT is configured for transmit testing.

Figure 4:
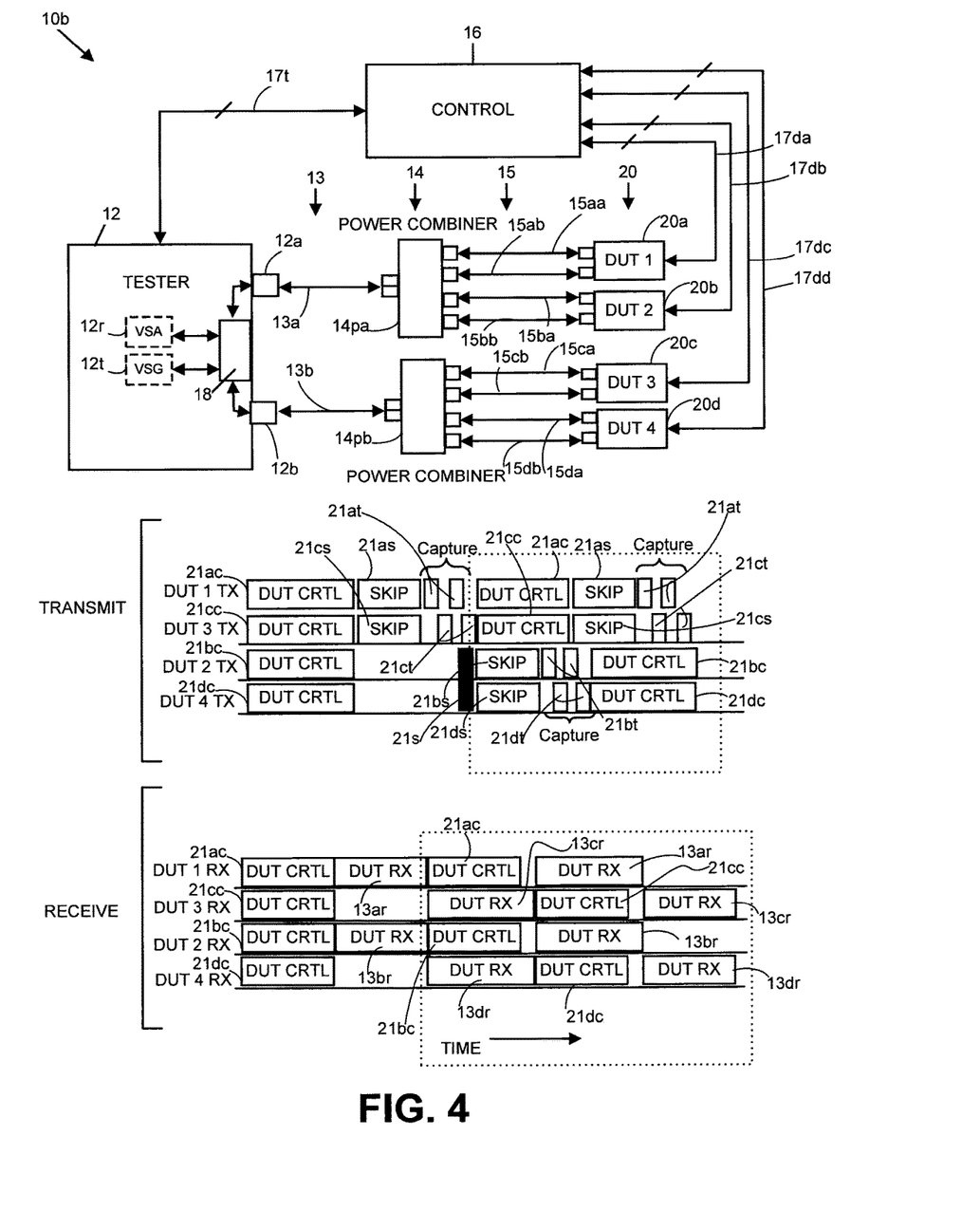
FIGS. 4 and 5 depict alternative testing environments and associated signal diagrams for additional exemplary embodiments in which DUT transmit and receive signal testing is interleaved with DUT controls for upcoming DUT tests.

Referring to FIG. 4, another testing environment 10*b* in accordance with another exemplary embodiment can test four 2×2 MIMO DUTs 20*a*, 20*b*, 20*c*, 20*d*, with one tester 12. (Alternatively, the DUTs 20 can be single-input, single-output (SISO) DUTs, though greater benefits can be realized when testing MIMO DUTs connected to power combiners 14*pa*, 14*pb*, as shown. Also, if two 3×3 MIMO DUTs were to be tested instead, a 6:1 power combiner/divider would be used as the signal routing circuitry 14.) As before, by ensuring that the DUT control sequences 21*ac*, 21*bc*, 21*cc*, 21*dc* are performed concurrently with signal tests (e.g., transmit and receive) involving conveyance of test signals between the tester 12 and DUTs 20, interleaving of operations and, therefore, test time and cost reduction, will occur, thereby increasing test efficiency in reducing test time on a per-DUT basis. Additionally, during transmit testing, as shown, a start command 21*s* can be used to initiate the transmit signal test sequence for two DUTs, 20*b*, 20*d* during configuration of the other two DUTs 20*a*, 20*c*. Again, as discussed above, DUT signal reception statistics can be retrieved during the DUT control sequences 2*l* ac, 21*bc*, 21*cc*, 21*dc* for the receive signal test sequences.

Figure 5:
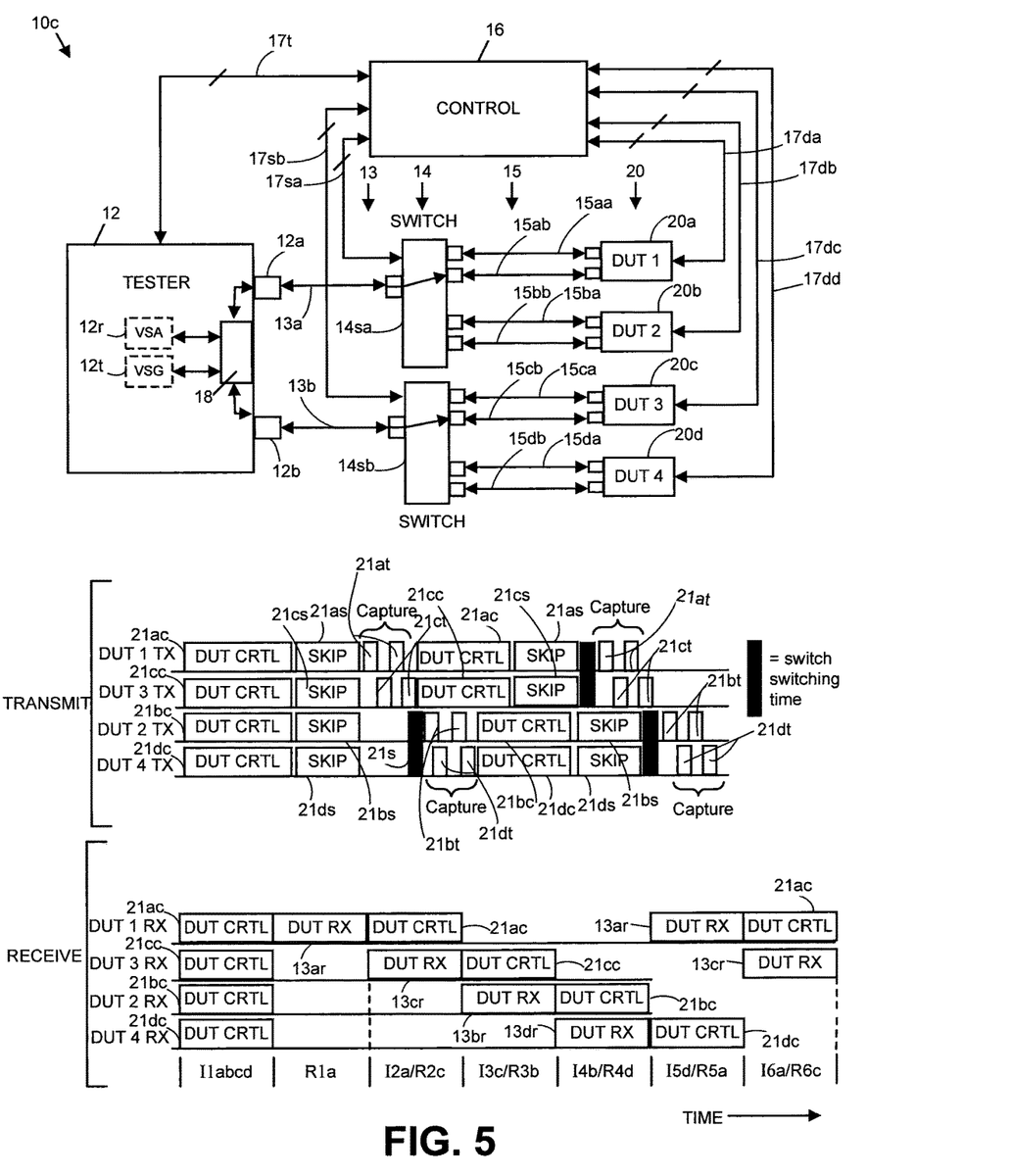

Referring to FIG. 5, another testing environment 10*c* in accordance with another exemplary embodiment can use signal switches 14*sa*, 14*sb* as the signal routing circuitry 14. These switching circuits 14*sa*, 14*sb* can be controlled by the control system 16 via additional control signal interfaces 17*sa*, 17*sb*. As with other embodiments, interleaving occurs with concurrent DUT configuration and testing. In this case, transmit signal testing efficiency increases due to concurrent "skip" intervals 21*as*, 21*bs*, 21*cs*, 21*ds* (during which the DUT transmitters are allowed to achieve steady state operations, as discussed above), though receive signal testing efficiency may be less due to the inability to provide the tester source signal to multiple DUTs simultaneously. In this testing environment 10*c*, interleaving of DUT control and receive testing occurs on a rotating basis among the DUTs 20*a*, 20*b*, 20*c*, 20*d*, as can be seen over the test time intervals I2a/R2c, I3c/R3b, I4b/R4d, I5d/R5a, I6a/R6c.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of using tester data packet signals and control instructions for testing multiple data packet signal transceiver devices under test (DUTs), comprising:

receiving, with each one of first one or more of a plurality of DUTs with data packet signal reception enabled during one of a first plurality of tester signal intervals, a respective one of a plurality of tester data packet signals;

receiving, with each one of second one or more of said plurality of DUTs with data packet signal reception enabled during one of a second plurality of tester signal intervals, a respective one of said plurality of tester data packet signals;

executing, with each one of said first one or more of said plurality of DUTs with data packet signal reception disabled during one of a first plurality of instruction intervals, a plurality of DUT control instructions to configure each one of said first one or more of said plurality of DUTs to receive a respective one of said plurality of tester data packet signals with one or more of an upcoming prescribed power level, data rate or modulation type; and executing, with each one of said second one or more of said plurality of DUTs with data packet signal reception disabled during one of a second plurality of instruction intervals, a plurality of DUT control instructions to configure each one of said second one or more of said plurality of DUTs to receive a respective one of said plurality of tester data packet signals with one or more of an upcoming prescribed power level, data rate or modulation type;

wherein
respective ones of said first plurality of tester signal intervals and said first plurality of instruction intervals are mutually alternating, respective ones of said second plurality of tester signal intervals and said second plurality of instruction intervals are mutually alternating, respective ones of said first plurality of tester signal intervals are substantially contemporaneous with respective ones of said second plurality of instruction intervals, and respective ones of said second plurality of tester signal intervals are substantially contemporaneous with respective ones of said first plurality of instruction intervals.

2. The method of claim 1, wherein:
respective ones of said first and second pluralities of tester signal intervals are mutually alternating; and
respective ones of said first and second pluralities of instruction intervals are mutually alternating.

3. The method of claim 1, wherein said respective ones of said first and second pluralities of tester signal intervals are mutually exclusive.

4. The method of claim 1, wherein said respective ones of said first and second pluralities of instruction intervals are mutually exclusive.

5. The method of claim 1, wherein said respective ones of said first and second pluralities of instruction intervals are partially contemporaneous.

6. The method of claim 1, wherein:
respective ones of said first and second pluralities of tester signal intervals comprise odd and even ones, respectively, of a sequence of tester signal intervals;
respective ones of said first and second pluralities of instruction intervals comprise odd and even ones, respectively, of a sequence of instruction intervals;
respective odd ones of said sequence of tester signal intervals are substantially contemporaneous with respective even ones of said sequence of instruction intervals; and
respective even ones of said sequence of tester signal intervals are substantially contemporaneous with respective odd ones of said sequence of instruction intervals.

7. A method of providing tester data packet signals and control instructions for testing multiple data packet signal transceiver devices under test (DUTs), comprising:
providing, for each one of first one or more of a plurality of DUTs with data packet signal reception enabled during one of a first plurality of tester signal intervals, a respective one of a plurality of tester data packet signals;

providing, for each one of second one or more of said plurality of DUTs with data packet signal reception enabled during one of a second plurality of tester signal intervals, a respective one of said plurality of tester data packet signals;

providing, for execution by each one of said first one or more of said plurality of DUTs with data packet signal reception disabled during one of a first plurality of instruction intervals, a plurality of DUT control instructions to configure each one of said first one or more of said plurality of DUTs to receive a respective one of said plurality of tester data packet signals with one or more of an upcoming prescribed power level, data rate or modulation type; and providing, for execution by each one of said second one or more of said plurality of DUTs with data packet signal reception disabled during one of a second plurality of instruction intervals, a plurality of DUT control instructions to configure each one of said second one or more of said plurality of DUTs to receive a respective one of said plurality of tester data packet signals with one or more of an upcoming prescribed power level, data rate or modulation type;

wherein
respective ones of said first plurality of tester signal intervals and said first plurality of instruction intervals are mutually alternating, respective ones of said second plurality of tester signal intervals and said second plurality of instruction intervals are mutually alternating, respective ones of said first plurality of tester signal intervals are substantially contemporaneous with respective ones of said second plurality of instruction intervals, and respective ones of said second plurality of tester signal intervals are substantially contemporaneous with respective ones of said first plurality of instruction intervals.

8. The method of claim 7, wherein:
respective ones of said first and second pluralities of tester signal intervals are mutually alternating; and
respective ones of said first and second pluralities of instruction intervals are mutually alternating.

9. The method of claim 7, wherein said respective ones of said first and second pluralities of tester signal intervals are mutually exclusive.

10. The method of claim 7, wherein said respective ones of said first and second pluralities of instruction intervals are mutually exclusive.

11. The method of claim 7, wherein said respective ones of said first and second pluralities of instruction intervals are partially contemporaneous.

12. The method of claim 7, wherein:
respective ones of said first and second pluralities of tester signal intervals comprise odd and even ones, respectively, of a sequence of tester signal intervals;
respective ones of said first and second pluralities of instruction intervals comprise odd and even ones, respectively, of a sequence of instruction intervals;
respective odd ones of said sequence of tester signal intervals are substantially contemporaneous with respective even ones of said sequence of instruction intervals; and respective even ones of said sequence of tester signal intervals are substantially contemporaneous with respective odd ones of said sequence of instruction intervals.

\* \* \* \* \*